US006530835B1

(12) United States Patent
Walker et al.

(10) Patent No.: US 6,530,835 B1
(45) **Date of Patent: *Mar. 11, 2003**

(54) FREE LONG DISTANCE CALLS ON SLOT MACHINES

(75) Inventors: Jay S. Walker, Ridgefield, CT (US); James A. Jorasch, Stamford, CT (US); Thomas M. Sparico, Riverside, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,903

(22) Filed: Aug. 18, 2000

Related U.S. Application Data

(63) Continuation of application No. 08/821,437, filed on Mar. 21, 1997, now Pat. No. 6,139,431.

(51) Int. Cl.[7] .......................... A63F 9/24; H04M 17/00

(52) U.S. Cl. ...................... 463/25; 463/20; 379/144.05; 379/93.13

(58) Field of Search ................................ 463/1, 12–13, 463/16, 20, 25–29, 40, 41, 42, 30, 36; 273/143 R, 292, 293; 379/90.01, 91.01, 93.13, 114.01, 114.03, 114.05, 114.11, 114.15–114.28, 115.02, 144.05, 143; 705/1, 14, 35, 41; 902/22, 23; 340/825, 825.33, 323 R, 870.01, 870.07, 870.16

(56) References Cited

U.S. PATENT DOCUMENTS 4,760,527 A 7/1988 Sidley ........................ 364/412
5,018,021 A 5/1991 Slater ......................... 358/349
5,179,517 A 1/1993 Sarbin et al. ............... 364/410
5,259,613 A 11/1993 Marnell, II ................. 273/138
5,276,312 A 1/1994 McCarthy ................... 235/380
5,321,241 A 6/1994 Craine ........................ 235/380
5,429,361 A 7/1995 Raven et al. ............... 273/138
5,456,648 A 10/1995 Edinburg et al. .............. 482/4
5,655,961 A 8/1997 Acres et al. .................. 463/27
5,755,621 A 5/1998 Marks et al. ................. 463/42
5,770,533 A 6/1998 Franchi ....................... 463/42
5,909,486 A * 6/1999 Walker
6,113,495 A * 9/2000 Walker
6,139,431 A * 10/2000 Walker
6,229,879 B1 * 5/2001 Walker
6,327,351 B1 * 12/2001 Walker

OTHER PUBLICATIONS

"On the Light Side", The Associated Press, May 27, 1989, Domestic News Section.

Finnigan, David, "'Call Girls' Wow 'Em at Gaming Confab", Las Vegas Business Press, Oct. 7, 1991, vol. 8; No. 36; Sec 1; p. 1.

"Mirage Resorts, Incorporated Licenses Video Conferencing Technology From C–Phone Corporation; C–Phone Hardware and Software Drives State–of–the–Art Video Customer Service Network in Slot Machines at Treasure Island", PR Newswire, Jan. 15, 1997, Financial News Section.

* cited by examiner

*Primary Examiner*—Mark Sager
(74) *Attorney, Agent, or Firm*—Steven M. Santisi

(57) ABSTRACT

A gaming machine that provides free long distance telephone calls, or audio entertainment, as a reward for the continued playing of the gaming machine. The player may continue the free long distance phone call, or continue receiving the audio entertainment, as long his play meets a predetermined level of usage criteria.

33 Claims, 9 Drawing Sheets

FIG. 3
PLAYER DEPOSITS COIN(S) INTO SLOT MACHINE AND INITIATES PLAY
S301
PLAYER PICKS UP COMMUNICATIONS DEVICE AND RECEIVES DIAL TONE
S302
PLAYER MAKES A LONG DISTANCE PHONE CALL VIA CASINO'S LONG DISTANCE PROVIDER
S303
PLAYER'S CALL CONTINUES PROVIDED CASINO CRITERIA FOR CONTINUING ESTABLISHED CONNECTION ARE MET
S304
CASINO'S LONG DISTANCE PROVIDER BILLS CASINO ON A PER SLOT MACHINE BASIS
S305

710

| HOLD | COIN DENOMINATION | PROFIT PER COIN | 5% CASINO WILL SPEND ON TELECOM PER COIN | CONNECTION TIME PER COIN DEPOSITED | DISCONNECT WARNING TIME | LIMITATIONS | SERVICE TYPE |
|---|---|---|---|---|---|---|---|
| 6% | DOLLAR | $0.03 | $0.006 | 3.6 SECONDS | 10 SECONDS | US ONLY | LONG DISTANCE |
| 2% | FIVE DOLLAR | $0.10 | $0.005 | 24 SECONDS | 10 SECONDS | NO LIMIT | SPORTS SCORES |
| 1% | TWENTY FIVE DOLLAR | $0.25 | $0.0125 | 30 SECONDS | 10 SECONDS | NO LIMIT | COMEDY ROUTINE |

FIG. 7

FREE LONG DISTANCE CALLS ON SLOT MACHINES

CROSS REFERENCE TO RELATED APPLICATION

This application is a continuation of U.S. patent application Ser. No. 08/821,437, entitled "Free Long Distance Calls on Slot Machines", which was filed on Mar. 21, 1997, now U.S. Pat. No. 6,139,431.

The present invention relates to Applicant docket number WD2-97-017 titled: An Electronic Gaming System Offering Premium Entertainment Services for Enhanced Player Retention, filed Mar. 12, 1997.

BACKGROUND OF THE INVENTION

The invention relates to the field of gaming machines. In particular, this invention relates to a slot machine that provides telephone service, such as free long distance calls, in response to the playing of the slot machine.

Casinos profit from their patrons frequently playing their gaming machines, such as slot machines, video poker or video blackjack. Each gambling machine is designed to ensure that, on average, the casino retains a predetermined percentage of the total amount gambled (the hold percentage or "vig"). In fact, gaming machines generally have a very high hold percentage, often surpassing the table games of blackjack, roulette or craps. Thus, the more these gambling machines are played, the greater is the revenue to the casino. Accordingly, it is highly desirable to provide ways to maintain player interest and keep players of gambling machines playing longer. Moreover, casinos are always looking for new, fun ways to attract players to the slot machines, as well as to draw existing players away from competing casinos.

To try to satisfy this need, casinos have instituted slot machine marketing programs, which reward slot players with bonus points in proportion to the amount of their play. Each slot player is entitled to a slot card and an account upon signing up at the casino. The player then selects a slot machine and inserts the slot card into the machine before playing. Each time the player plays the slot machine, using currency such as bills, coins, casino tokens or casino play credits, a central computer adds bonus points to the player's account. After the player finishes playing the accumulated bonus points may be redeemed for food and drinks, prizes and services. This concept is analogous to an airline "frequent flyer" program—the more you fly, the more bonus miles you receive.

Slot card programs, like frequent flyer programs, suffer from one major drawback, in that they merely promise future rewards. Future rewards only weakly motivate a slot player to play longer, because while the player is playing, future rewards are unseen, untouchable and generally perceived by the player as unobtainable. Accordingly, casinos need an affordable, entertaining reward that can be distributed and used immediately while the player is playing at the slot machine, thus providing the player a stronger incentive to play longer.

In addition, some casinos have provided their slot players the capability of making phone calls while they play slot machines. At one casino, cellular phone servers, much like the well-known cigarette girls of nightclubs, walk from slot machine to slot machine selling cellular phone service to the players. For this service, players are charged by the minute. In addition, at Trump Castle Hotel and Casino in Atlantic City, so called "premium slot areas" have phone jacks, to which a standard telephone can be installed near each slot machine upon a player's request. Some casinos have phones installed in the slot machines. The cell phone service, phone jacks, and installed phones, however, are merely conveniences offered to the slot players so that they can make phone calls without having to leave their "lucky" or "hot" slot machines, and they do not provide any reward to the slot players for playing the machines.

Additionally, Mirage Resorts Treasure Island casino offers a video concierge service to assist slot players. This service networks a slot machine's video display to a video call center, thus providing a video conference link between the slot player and a hotel concierge. The slot player can use this system to order show tickets and make dinner or hotel reservations without having to leave the slot machine. Like the cell phone service or phone jacks, the video concierge system serves the slot players while they are playing and thus helps keep the players at the slot machines. The video concierge system, however, does not provide any free phone or other service as a reward to motivate the players to play the machines longer. The phones are "hard wired" to the video call center and cannot dial other numbers, much like a courtesy phone in a hotel where you can only dial the front desk.

SUMMARY OF THE INVENTION

To overcome the above-described problems, a slot machine is adapted to provide a service. The slot machine includes means for receiving currency, means responsive to the receipt of currency for enabling a game play, and means responsive to the receipt of currency for enabling a connection to the service for a predetermined period of time.

For example, a slot machine is adapted to reward its players free telephone service for the continued playing of the machine. Alternatively, the reward may be free audio service. The slot players are able to make free long distance phone calls from the slot machine as long as their play equals or exceeds a predetermined level of play.

The player first deposits currency or tokens into the slot machine and then pulls the handle, causing the reels to spin. Meanwhile, the player is given access to a free telephone connection for a predetermined period of time. The player may then place a telephone call using the telephone connection. The player may continue the call by repeatedly playing the slot machine, or may instead permit the slot machine to deduct previously earned credits of free phone time from his account.

Thus, as long as the slot player initiates a minimum number of plays over a predetermined time interval, the slot player will be allowed to call long distance for free. The player is therefore rewarded immediately for his gaming, which serves as a strong incentive to continue playing. The reward is also an affordable, fun way for the casinos to attract new patrons.

BRIEF DESCRIPTION OF THE DRAWINGS

These and other features and advantages of the present invention can best be understood by reference to the detailed description of the preferred embodiments set forth below taken with the drawings, in which:

FIG. 7 is a table containing an example of casino connection rules of the first embodiment of the present invention.

DETAILED DESCRIPTION OF THE PREFERRED EMBODIMENTS

In a first embodiment of the present invention, a gaming machine, such as a slot machine, video poker or video blackjack machine, is provided that enables the player to make phone calls therefrom, whereby the player is rewarded free phone connection time to various localities based on the amount of currency played and money wagered. The currency may be coins, casino tokens or casino credits.

Figure 1:
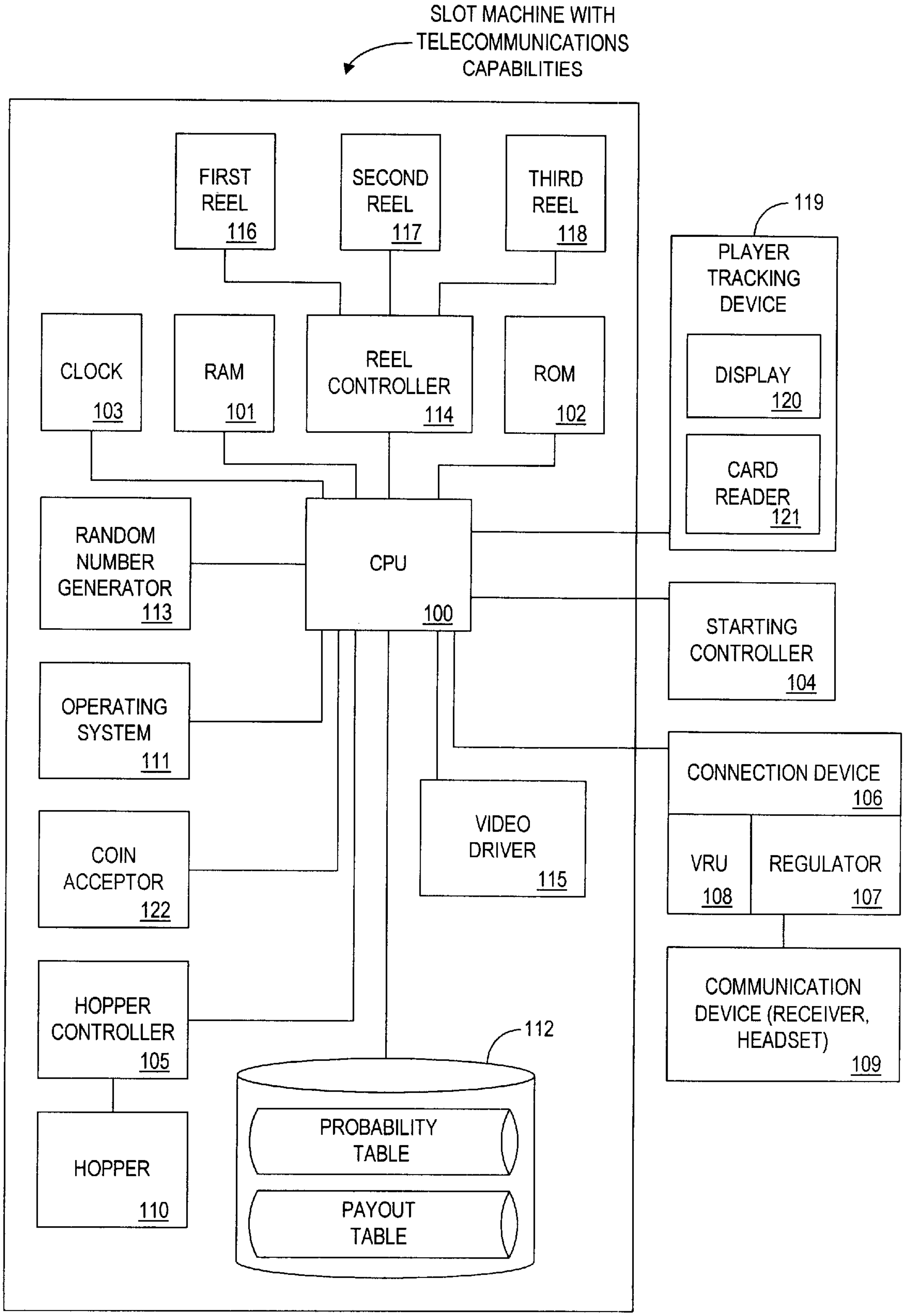
FIG. 1 depicts a block diagram of a slot machine with telecommunications capability in accordance with the first embodiment of the present invention.

As shown in FIG. 1, a slot machine capable of providing phone service in accordance with the first embodiment of the present invention includes the following components: a central processing unit (CPU) 100 for controlling the slot machine, a random access memory (RAM) 101, a read-only memory (ROM) 102, a clock 103 and an operating system 111. The CPU is also connected to a starting controller 104, a hopper controller 105, a connection device 106, a data storage device 112 having a probability table and payout table stored therein, a random number generator 113, a reel controller 114 and a video driver 1and coin acceptor 122. The hopper controller 105 is connected to a coin hopper 110. The phone connection device 106 includes a regulator 107 and a voice response unit (VRU) 108, and can be connected to a communication device 109, such as a standard telephone or a telephone receiver/headset combination. It should be noted that the communication device could be a conventional telephone which plugs into a standard phone jack in the slot machine. The telephone could also be incorporated into the slot machine. The reel controller 114 is connected to the first reel 116, second reel 117 and the third reel 118. The CPU 100 of the slot machine is also connected to a standard player tracking device 119, which includes a display 120 and a slot card reader 121. The operation of the operating system 111, the data storage device 112, the random number generator 113, the reel controller 114, the video driver 115, the three reels 116–118, the hopper 110, the hopper controller 105 and player tracking device 119 (including display 120 and slot card reader 121), are well known in the art.

Figure 2:
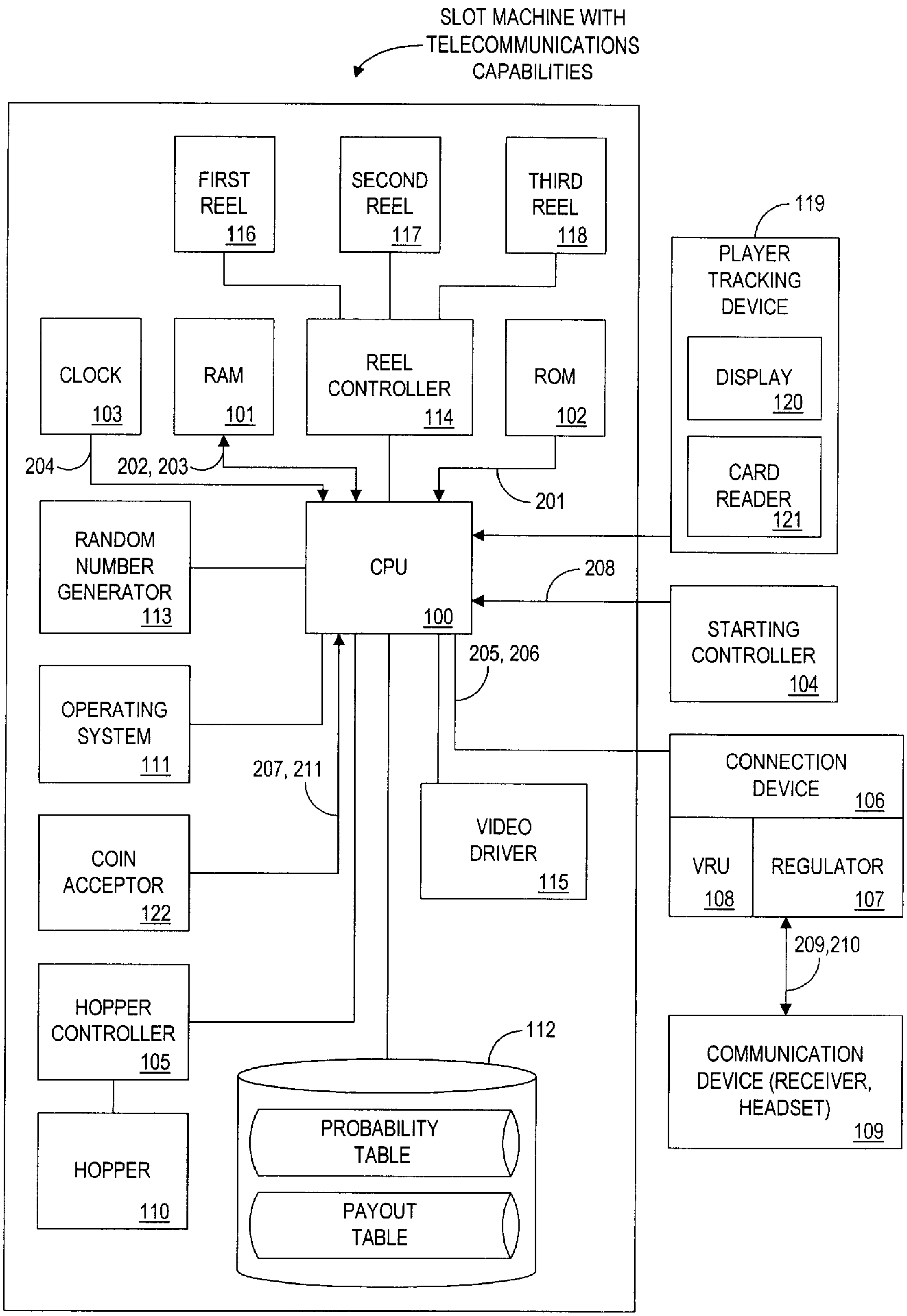
FIG. 2 depicts the data flows between some of the components of the slot machine of FIG. 1.

FIG. 2 identifies the data flows 201–211 between the components of FIG. 1 used in the embodiments of the present invention, as follows. The ROM 102 sends to the CPU 100 the connection program commands 201. The,CPU 100 sends connect and disconnect times 202 to the RAM 101, and receives connect and disconnect times 203 from the RAM 101. The clock 103 provides exact time data and countdown information 204 to the CPU 100. The CPU respectively sends the regulator 107 and VRU 108 of connection device 106 a connect/disconnect command and VRU commands 205. The connection device 106 sends to the CPU 100 information regarding the open/closed status of the regulator 107, and the dialed phone number 206. The starting controller 104 provides the CPU 100 with a signal 208 indicating initiation of play. The connection device 206 provides the communication device 109 with a dial tone/connection signals and VRU commands and queries 209, and receives from the same the dialed phone number and VRU responses 210. The coin acceptor 122 provides the CPU 100 a coin-received signal 207 indicating that coins have been deposited into the coin acceptor 122 by the player, as well as information 211 regarding the number of coins deposited.

Figure 3:
FIG. 3 is a flowchart describing an overview of the process by which the slot machine of the first embodiment of the present invention is operated.

The flowchart shown in FIG. 3 provides an overview description of the method of operating the slot machine and making a phone call therefrom in accordance with the first embodiment of the present invention. In step S301, a player begins to play the machine by depositing one or more coins or casino tokens into the coin acceptor of the slot machine. Alternatively, the player may use casino play credits earned from previous wins, as is well known in the art. The player instantly receives a reward of an initial period of phone connection time, as will be explained in more detail below. In step S302, the player "picks up," or otherwise activates, the attached communication device 109. This causes the communication device to send an "off-hook" or similar signal to the connection device 106, and, after establishing with the CPU 100 that the player is entitled to make a connection, the connection device 106 provides the communication device 109 with a dial tone. This allows the player to make a long distance telephone call via the casino's long distance telephone service provider in step S303 (Local and international calls can also be made in similar fashion). In step S304, the telephone call remains connected as long as the casinos slot playing criteria for continuing the phone connection are met by the player's continued use of the slot machine. Thus, as long as the slot player plays a minimum amount of currency over a predetermined time interval, the slot player will be permitted to establish and/or maintain the long distance telephone call for no additional cost. The player is therefore rewarded immediately for his continued gaming in a fun, low-cost way. Eventually, the phone call is terminated by the player or called party voluntarily, or by the CPU 100 if the player's slot machine play falls below the minimum allowable level. The casino's long distance phone service provider then bills the casino, in step S305, for the phone call on a per slot machine basis or in aggregate for all machines.

Figure 4:
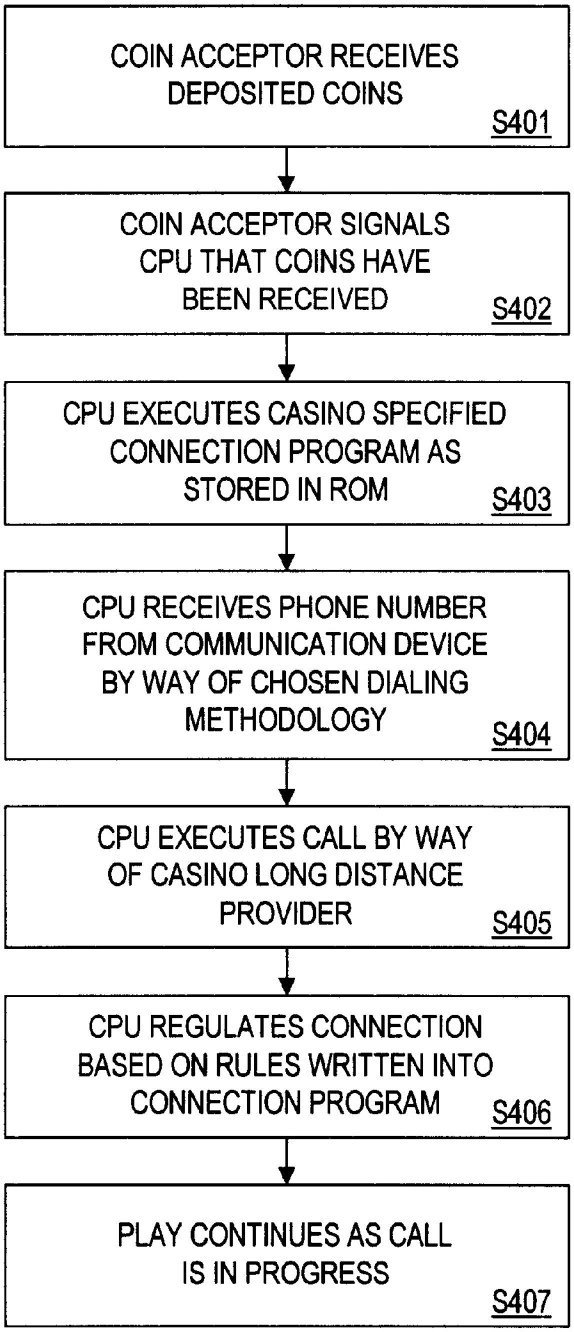
FIG. 4 is a flowchart describing the process by which play is initiated and a call is placed using the slot machine of the first embodiment of the present invention.

FIG. 4 is a flowchart describing in more detail the process by which a slot machine play enables a telephone call to be placed. In step S401, the player deposits one or more coins, casino tokens or other currency into the coin acceptor 122 of the slot machine. In step S402, the coin acceptor 122 signals the CPU 100 that coins have been deposited (data flow 207) and informs the CPU 100 of the number of deposited coins or tokens (data flow 211). Upon determining that play has been initiated the CPU 100 retrieves, as needed, the connection program commands 201 stored in ROM 102 (data flow 201). The player then initiates the game play by pulling the handle or hitting the spin button, the operation and control of which is well known in the art.

Once the connection program commands have been retrieved from the ROM 102, in step S403, the CPU 100 executes the commands to enable the phone connection, as explained in more detail below. The connection program commands establish the criteria which govern whether or not the phone connection is maintained with criteria such as coins/pull, time counter value, and disconnect warning time value. The connection program commands may be made casino specific, and can thus be tailored to meet each casino's particular gaming requirements. Once the starting controller 104 has provided the play initiation signal (data flow 208) to the CPU 100, the regulator 107 opens the communication channel. This establishes a dial tone in the phone receiver or headset 109. In step S404, the player picks up the phone receiver or headset 109 to place a phone call. This causes the communication device to send an "off-hook" or similar signal to the connection device 106, and the connection device 106 provides the communication device 109 with the dial tone (data flows 209 and 210). The player then enters the phone number using a receiver keypad, a stand-alone keypad or preferably a touch video screen on the slot machine display (not shown). The phone number is then sent to the connection device (data flow 210), which in turn sends it to the CPU 100 (data flow 206). In step S405, the CPU 100 places the call via the casino's local or long distance provider, and the player begins speaking to the connected party while continuing to play the slot machine in step S407.

Once the call has begun, the player must maintain a minimum rate of play or else the call will be terminated. For example, the player might have to put in three coins every twenty seconds to maintain the connection. For each coin or set of coins inserted a "time counter value" is established which represents the allowed connection time. This "time counter" functionality is similar to that used by pay phones where, for each quarter deposited, the caller gets a pre-established number of seconds of call time. In the present invention, a twenty second "time counter" begins to diminish as soon as the coins are deposited. The time counter value is stored in a register in RAM 101. Accordingly, in step S406, the CPU 100 monitors the play of the slot machine and regulates the phone connection based on the criteria of the executed connection program, as will be explained in further detail below. If the criteria of the connection program are met, the connection continues. Otherwise, the connection is terminated (of course, the player may always terminate the call voluntarily before he has used up his free time). The process for monitoring play and regulating the connection is described in more detail below.

Figure 5A:
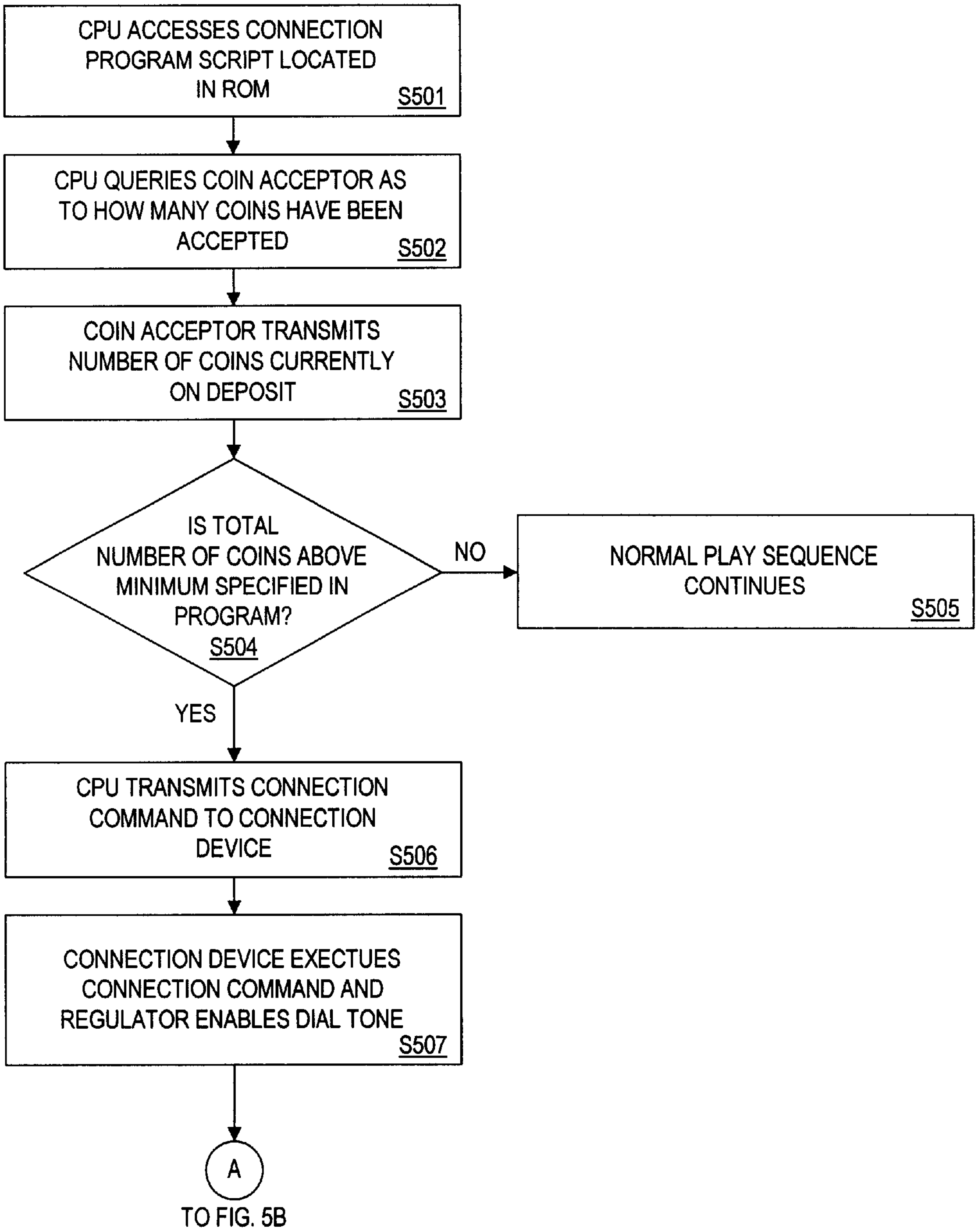
FIGS. 5*a* and 5*b* are flow charts describing the process by which the CPU executes the telephone service connection program stored in ROM of the slot machine of the first embodiment of the present invention.
Figure 5B:
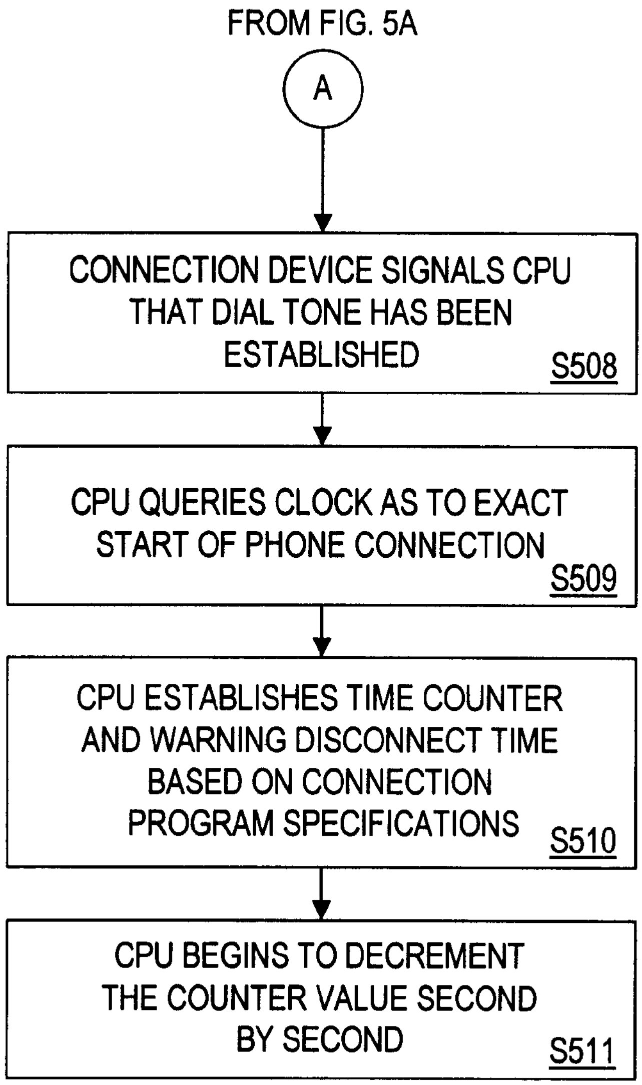

FIGS. 5*a* and 5*b* are flow charts describing in further detail step S403 of FIG. 4, the execution by the CPU 100 of the connection program retrieved from the ROM 102 in step S501. In step S502, CPU 100 queries the coin acceptor 122, requesting the number of coins deposited for this particular play. In step S503, the coin acceptor 122 transmits the number of coins played to the CPU 100 (data flow 207). CPU 100 then receives play initiation signal from the spin button or handle. In step S504, the CPU 100 decides whether the total number of coins played is above the minimum specified in the connection program 201. If so, the CPU 100 sends the connection command to the connection device 106 in step S506; if not, the player continues playing as usual, in step S505. In step S507, the connection device 106 transmits the connection command to the CPU 100 and the regulator 107 enables a dial tone. In step S508, the connection device 106 signals the CPU 100 that the dial tone has been established. After the player has dialed the phone number and the CPU has made the phone connection (steps S404 and S405), the CPU 100 queries the clock 103 as to the exact time of connection in step S509 (data flow 204). In step S510, the CPU 100,establishes the time counter value in seconds enabled by the game play. The CPU 100 also establishes the "disconnect warning time," the amount of time before disconnection when a warning to continue play will be given, established by the criteria of the connection program. Once established, the time counter value and disconnect warning times are stored in and retrieved from RAM 101 (data flows 202 and 203). In step S511, the CPU 100 begins to decrement the established time counter value second by second.

Figure 6A:
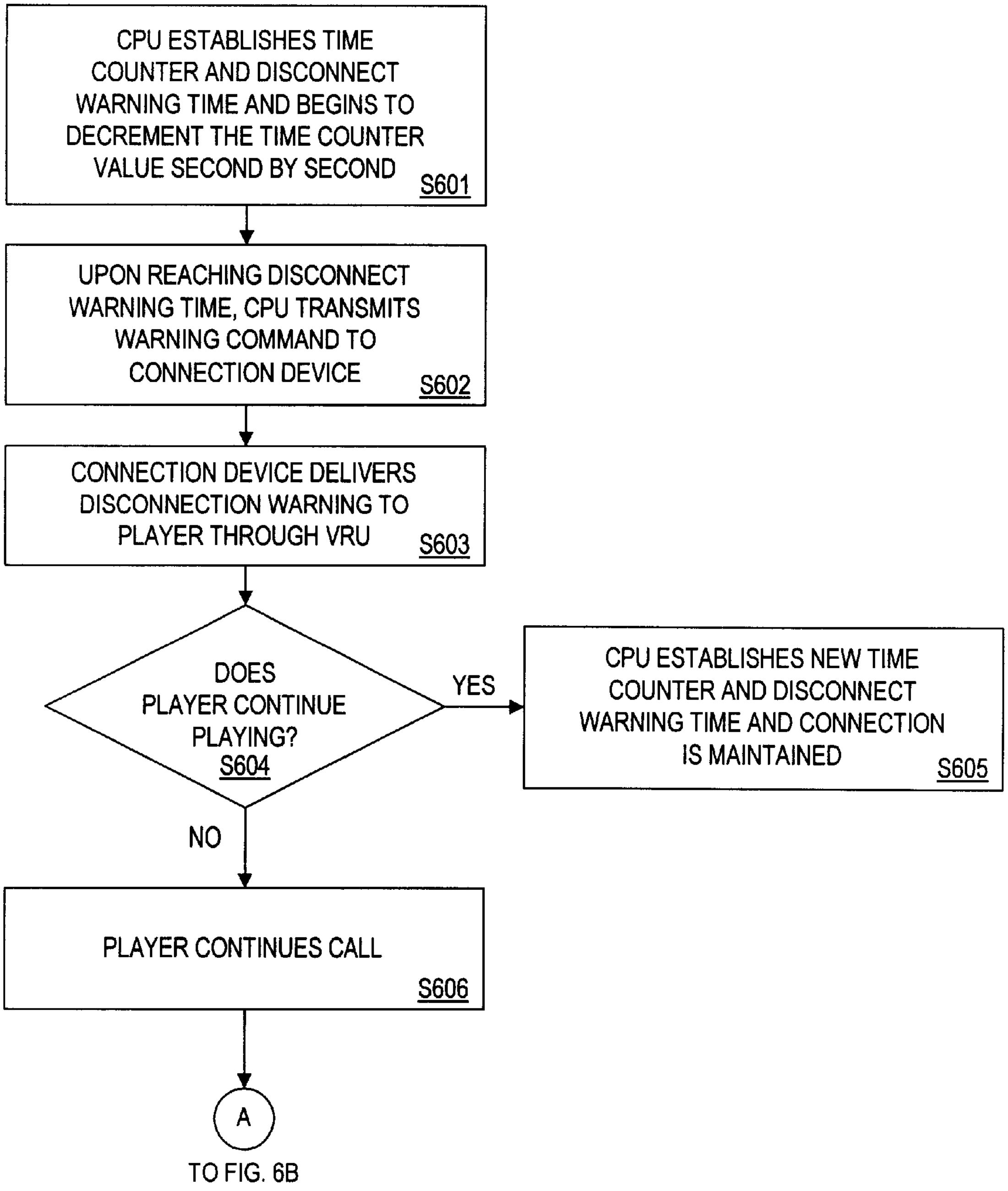
FIGS. 6*a* and 6*b* are flow charts describing the process by which the player is alerted that connection time is running out in the first embodiment of the present invention.
Figure 6B:
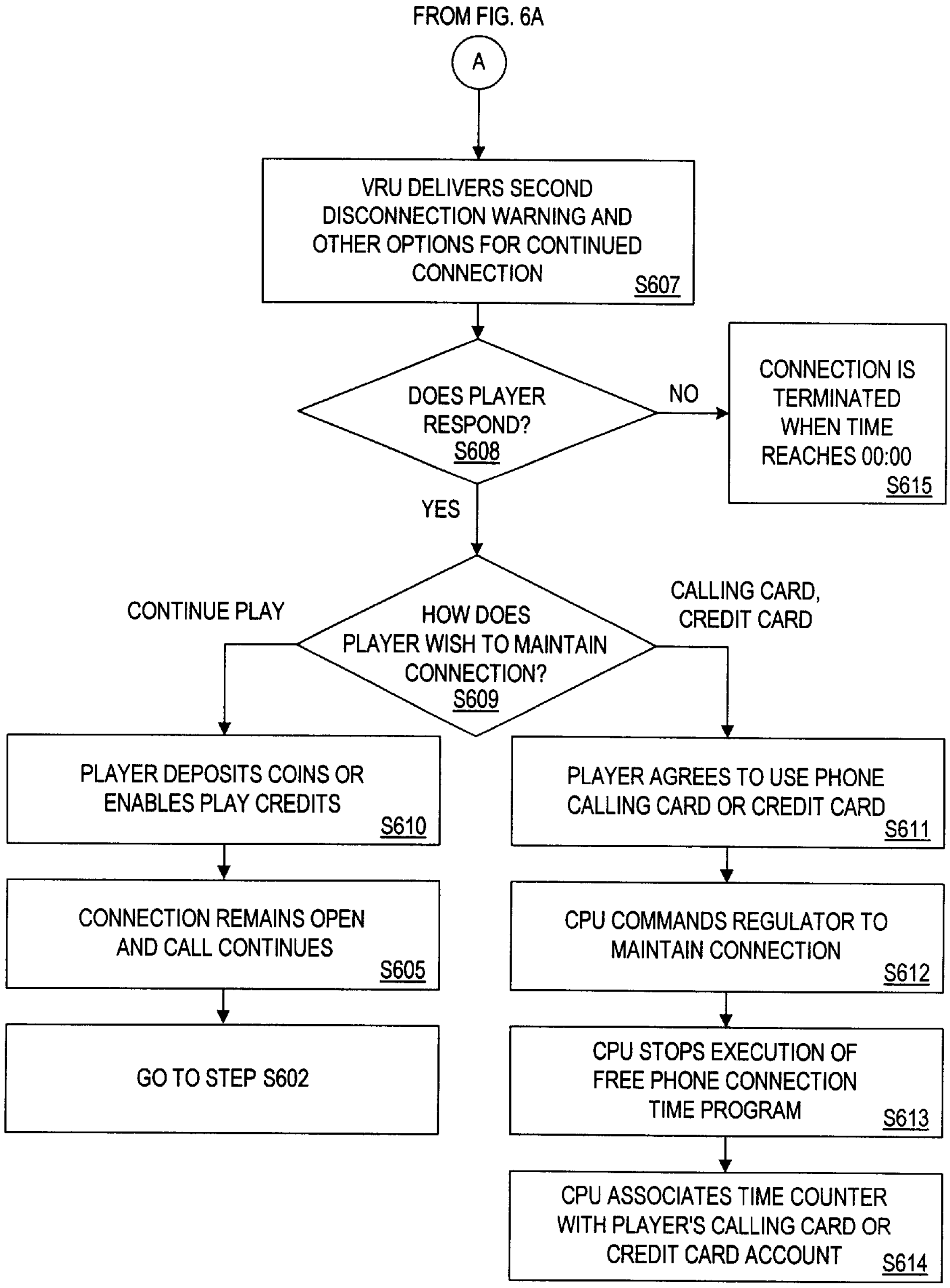

FIGS. 6*a* and 6*b* are flow charts describing in further detail step S406 of FIG. 4. In step S601 (see steps S510 and S511 of FIG. 5*b*), the CPU 100 establishes a tinge counter value (such as 30 seconds) and decrements it second by second as time passes. In step S602, when the time counter value reaches the disconnect warning time (such as 10 seconds) the CPU sends a warning command to the connection device 106 (data flow 205). In step S603, the connection device delivers a disconnection warning to the player over the communication device via the VRU 108 (data flow 209). The CPU 100 then monitors the coin acceptor 122 and receives the play initiation signal from the spin button and handle to determine whether the player has initiated another play. As is apparent, if the player continues playing the slot machine, he is immediately rewarded with additional phone connection time, as the CPU 100 resets the time counter value to its original level and maintains the phone connection in step S605. If the player continues the call and does not initiate additional play by depositing coins and pulling the handle as in step 606, the CPU 100 may instruct the VRU 108 to deliver a second warning to the player as in step 607. The CPU then monitors whether the player responds in step S608. If the player does not respond to the second warning, in step S615 the connection is terminated when the time counter expires by reaching zero. If the player does respond in step S608, in step S609 the CPU determines how the player wishes to maintain the phone connection. The player can maintain the connection by (1) depositing more coins or tokens into the slot machine or by using a play credit to play the machine, in step S610, or by (2) instructing the CPU 100, via the VRU 108 and a telephone keypad or preferably a video monitor keypad, to use a phone calling card or credit card, in step S611. In the first option, in step S605, the time counter value is reset. The connection remains open and the call continues, with program execution returning to step S602.

For the second option, the CPU commands the regulator 107 to keep the connection open in step S612. In step S613, the CPU 100 stops the connection program, and in step S614, the CPU 100 charges further time beyond the expiration of the previously assigned time counter value to the player's calling card or credit card account, as is well known in the art.

Alternatively, the accumulated and stored phone connection time in RAM 101 may not be added to the phone connection time in step S510. In this case, when the second disconnect warning is given, the player may be offered by the VRU 108 another option of using all or some of the stored phone connection time to continue the phone call.

A casino using the present invention could be billed by the local or long distance service provider for all of the calls made from slot machines on a machine-by-machine basis, as each machine would have its own line. Alternatively, the phone company could bill the casino for all the lines in aggregate. Of course, the slot machines could be also connected to a standard private branch exchange within the casino, which in turn is connected to the service provider's phone lines.

FIG. 7 shows an example of casino-specific connection program criteria 710 permanently stored in ROM 102 and temporarily stored during connection program execution in RAM 101. Of course, it should be understood that both the connection program and the following criteria may also reside in software on a separate memory medium which can be imported into RAM 101 and executed by the CPU 100 by means well-known in the computing art. As FIG. 7 shows, by depositing three dollar tokens into a dollar slot machine, the player will be immediately given 10.8 seconds of free long distance phone time for calls made within the continental United States. Depositing three five dollar tokens into a five dollar slot machine will provide 72 seconds of phone connection time for both domestic and international calls. Other slot machine denominations will provide more or less phone connection time per deposited coin, and that time may also be geographically limited, for example, to only the Central Time Zone ("CST") or the CST and the Pacific Time Zone ("PST"). Disconnect warning times are usually 10 seconds before the time counter value expires, but may vary with the slot machine denomination as well. It should be noted that current telecommunications costs make it less economically feasible to practice this invention on penny, dime, and quarter slot machines. In the future, however, telecommunications costs may be low enough such that this invention could be easily implemented on any denomination slot machine. Of course the casino may implement rules designed for lower denomination. For example, the player might have to play for thirty minutes on a quarter machine before having the ability to make a free long distance call.

FIG. 7 also shows an example of the economics behind the free telephone service. For example, a dollar slot machine will typically have a three percent hold percentage. This means that for every dollar played, the casino averages a three cent profit. The casino may allow five percent of those winnings to be given back to the player. Five percent of that profit per coin, $0.006, would be given to the player in the form of free phone time. For each dollar played, 3.6 seconds of tree phone connection time is provided.

In addition, the CPU 100 may determine, via the player's slot card, for example, that the player has "high roller" status. In this case, the casino may provide a high roller player with unlimited, free phone connection time for as long as the player keeps his card in the slot card reader, or until a predetermined time after the player has stopped playing the machine. This may be accomplished by simply commanding the regulator 107 to keep the connection open until the player finishes playing the slot machine.

A first example of playing a slot machine of the present invention and making a phone call therefrom follows. Assume a slot player begins play on a five dollar slot machine. The player inserts three dollar coins or tokens and pulls the handle of the slot machine. While the reels spin, the player picks up the phone and hears a dial tone, as described above, and dials a long distance call to New York City. Upon initiating the call, the CPU 100 begins to count down 72 seconds of phone connection time, that is, 3 coins times 24 seconds per coin. If the player does not insert another coin, or does not use any previously earned play credits within that 72 second time interval then the call will be terminated, after a warning has been provided when 10 seconds of phone time are left. Otherwise, the call will continue for the additional phone time connection rewarded to the player.

A second example describes an alternative embodiment of the present invention. Assume the player has been playing a dollar slot machine for over an hour, depositing one coin per handle pull at a rate of 400 handle pulls per hour, and not made any phone calls. The slot machine stores a "free phone time balance" or the total number of accumulated seconds over that hour in RAM 101. The player then inserts three dollar tokens and pulls the handle. He then picks up the phone receiver and initiates a long distance phone call. The player now has 1,450 seconds of phone connection (3 coins deposited time 3.6 seconds per coin plus 1,440 seconds previously earned). In this example, the player does not insert any more coins or otherwise continue playing. With ten seconds remaining, the CPU 100 directs the VRU 108 to warn the player that unless he continues playing, the call will be terminated. The player ignores the warning, and when the time expires, the phone call is terminated. It should be noted that the casino may choose to only offer a portion of the accumulated seconds as the total may be so high that it results in inactive play time for the machine.

In another embodiment of the present invention, instead of free long distance phone service, players may be provided with premium service(s) such as, for example, rewards, of free phone connection time to premium telephone services such as sports lines, adult entertainment lines, psychic entertainment lines and chat lines. Further, the casino may instead provide free audio entertainment, via headphones for example, to the players. Such audio services may include comedy, music, news and the like. In this embodiment, the casino may need to replace the phone connection device 106 with an audio connection device, and the communication device 109 with audio listening equipment. These services are alternatives to placing a long distance call and would be enabled in the manner as a long distance call.

There has thus been provided a new and improved slot machine for rewarding free long distance telephone service to its players, thus providing a strong incentive to play frequently and continuously and in a fun and affordable way.

Of course, it will be appreciated that the invention may take forms other than those specifically described, and the scope of the invention is to be determined solely by the following claims.

What is claimed is:

1. A method of providing telephone service, comprising:

receiving currency deposited into a gaming machine;

enabling a game play in response to the receipt of currency; and enabling a connection to the telephone service for a predetermined period of time in response to the game play.

2. The method of claim 1, wherein the connection to the telephone service is enabled for a period of time that depends on the amount of the received currency.

3. The method of claim 2, further comprising providing a warning at a time before the period of time expires that also depends on the amount of the received currency.

4. The method of claim 1, wherein the telephone service is geographically limited.

5. A method of providing telephone service, comprising:

providing a gaming machine into which a player deposits currency to initiate a game play; and granting to the player access to a telephone service for a predetermined period of time in response to the depositing of currency into the gaming machine.

6. The method of claim 5, wherein the access to the telephone service is granted for a period of time that depends on the amount of the deposited currency.

7. The method of claim 6, further comprising providing a warning at a time before the period of time expires that also depends on the amount of the deposited currency.

8. The method of claim 7, wherein the telephone service is geographically limited.

9. A method of making a telephone call, comprising:

depositing currency into a gaming machine;

playing the gaming machine;

receiving access to a telephone connections for a predetermined period of time in response to the playing of the gaming machine; and placing a telephone call using the telephone connection.

10. The method of claim 9, wherein the access to the telephone connection is received for a period of time that depends on the amount of the deposited currency.

11. The method of claim 10, further comprising providing a warning at a time before the period of time expires that also depends on the amount of the deposited currency.

12. The method of claim 9, wherein the telephone call is geographically limited.

13. A method of providing a service, comprising:

receiving currency deposited into a gaming machine;

enabling a game play in response to the receipt of currency;

enabling a connection to the service for a predetermined period of time in response to the game play; and maintaining the connection beyond the predetermined period of time if a payment for continued use of the service is received.

14. The method of claim 13, wherein the service includes a telephone service.

15. The method of claim 13, wherein the service includes a premium telephone service.

16. The method of claim 15, wherein the premium telephone service is selected from the group consisting of a sports telephone service, an adult entertainment telephone service, a psychic entertainment telephone service, and a chat telephone service.

17. The method of claim 13, wherein the service includes an audio service.

18. The method of claim 13, wherein the payment for continued use of the service is made via a credit card account.

19. The method of claim 13, wherein the payment for continued use of the service is made via a calling card account.

20. A method of providing a service, comprising:

providing a gaming machine into which a player deposits currency to initiate a game play;

granting to the player access to a service for a predetermined period of time in response to the depositing of currency into the gaming machine; and continuing to grant to the player access to the service beyond the predetermined period of time if a payment for continued access of the service is received.

21. The method of claim 20, wherein the service includes a telephone service.

22. The method of claim 20, wherein the service includes a premium telephone service.

23. The method of claim 20, wherein the service includes an audio service.

24. The method of claim 20, wherein the payment for continued access of the service is made via a credit card account.

25. The method of claim 20, wherein the payment for continued access of the service is made via a calling card account.

26. A method of accessing a service, comprising:

depositing currency into a gaming machine;

playing the gaming machine;

receiving access to the service for a predetermined period of time in response to the playing of the gaming machine; and continuing to receive access to the service beyond the predetermined period of time by making a payment for continued access of the service.

27. The method of claim 26, wherein the service includes a telephone service.

28. The method of claim 26, wherein the service includes a premium telephone service.

29. The method of claim 26, wherein the service includes an audio service.

30. The method of claim 21, wherein the payment for continued access of the service is made via a credit card account.

31. The method of claim 21, wherein the payment for continued access of the service is made via a calling card account.

32. A gaming machine adapted to provide telephone service, comprising:

means for receiving currency deposited into the gaming machine;

means for enabling a game play in response to the receipt of currency; and means for enabling a connection to the telephone service for a predetermined period of time in response to the game play.

33. A gaming machine adapted to provide a service, comprising:

means for receiving currency deposited into the gaming machine;

means for enabling a game play in response to the receipt of currency;

means for enabling a connection to the service for a predetermined period of time in response to the game play; and means for maintaining the connection beyond the predetermined period of time if a payment for continued use of the service is received.

* * * * *